United States Patent [19]

Krogstad

[11] Patent Number: 4,495,882
[45] Date of Patent: Jan. 29, 1985

[54] HAWSER ATTACHMENT

[75] Inventor: Ivar Krogstad, Arendal, Norway

[73] Assignee: A/S Pusnes Marine and Offshore Services, Norway

[21] Appl. No.: 486,818

[22] Filed: Apr. 20, 1983

[30] Foreign Application Priority Data

Apr. 27, 1982 [NO] Norway ............................ 821389

[51] Int. Cl.³ .............................................. B63B 21/20
[52] U.S. Cl. ......................................... 114/230; 441/3
[58] Field of Search .................... 441/3, 4, 5; 114/230, 114/219; 267/154

[56] References Cited

U.S. PATENT DOCUMENTS

| 3,124,342 | 3/1964 | Ormond | 267/154 |
| 3,406,523 | 10/1968 | Baker et al. | 267/154 |
| 3,568,806 | 3/1971 | Butt | 267/154 |
| 3,677,371 | 7/1972 | Lutchansky et al. | 267/154 |
| 3,853,344 | 12/1974 | Shimoe | 267/154 |
| 4,317,421 | 3/1982 | Pollack | 114/230 |
| 4,392,447 | 7/1983 | Kaps | 114/230 |

Primary Examiner—Sherman D. Basinger
Assistant Examiner—Edwin L. Swinehart
Attorney, Agent, or Firm—Andrus, Sceales, Starke & Sawall

[57] ABSTRACT

A device for reducing tensile forces occurring in a mooring hawser (2) when a ship, particularly a tanker, is moored to a loading buoy having a rotatable top (11). The hawser is attached to a linkage (4, 5, 6, 7) which also is pivotably connected (13, 14) to the rotatable buoy top (11). One or more torsion bars (8, 9) has one of their ends non-rotatably attached to one or more of the links (4, 5, 6, 7) in the linkage, and the other end of the torsion bars (8, 9) is fixed against rotation.

2 Claims, 5 Drawing Figures

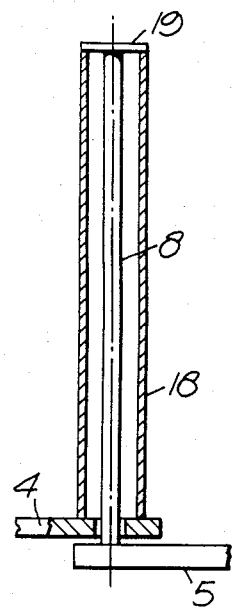
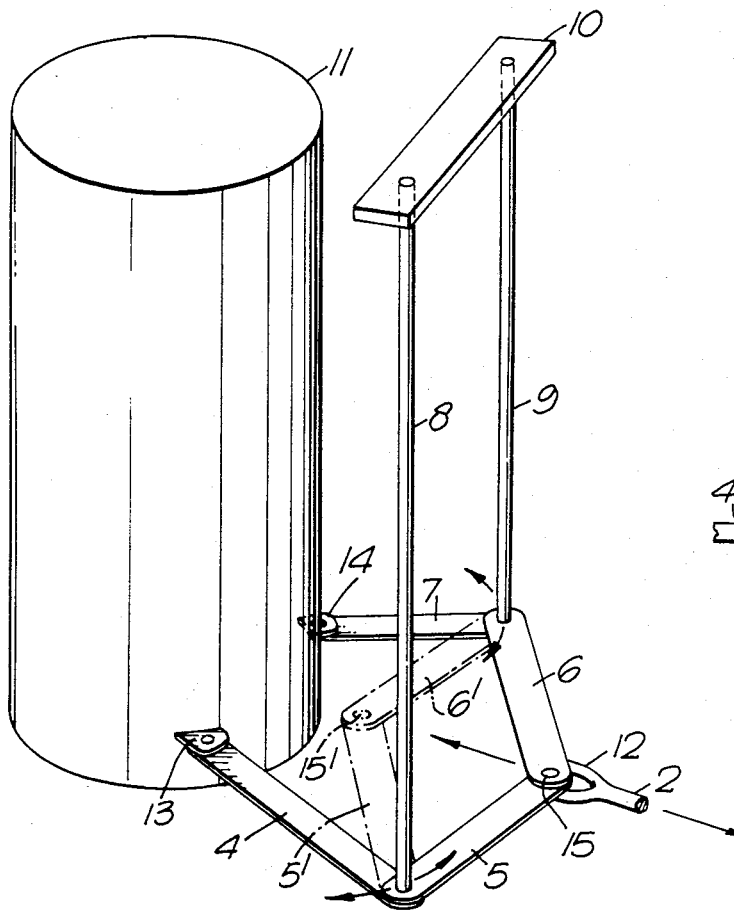
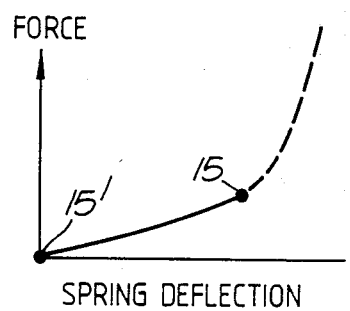
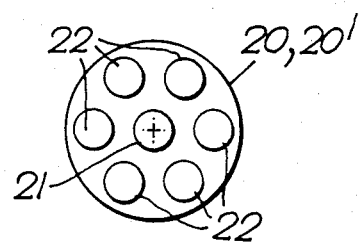

HAWSER ATTACHMENT

BACKGROUND OF THE INVENTION

The present invention relates to a device for reduction of tensile forces occurring in a mooring hawser when a ship, particularly a tanker, is moored in a point to a loading buoy or the like having a rotatable buoy top, where a linkage having a torsion spring device is arranged between the buoy top and the attachment for the mooring hawser.

The object of the invention is to provide a reduction in the occasionally very high stress peaks occuring in the mooring hawser in a relatively simple manner, which do not require manning of the buoy or any other installation where the mooring hawser is attached. Even though the buoy is relatively small with respect to the ship, it will largely follow the wave motions. So will the ship but with a different phase, so that the distance between the buoy and the ship may vary considerably.

A method is known for reducing the hawser force when the loading buoy is of the slender column type having a rotatable top section, wherein one utilizes the inherent elasticity in a long hawser for dampening the force variations occurring when wind, waves and current act differently on ship and buoy. This is done by running the hawser along the center of the buoy via a vertically positioned sheave and further substantially horizontally through a trumpetlike hawsehole and to the ship. In this manner the hawser is always run down along the central axis of the buoy. However, this method is somewhat costly since the sheave and its support, as well as the hawser attachment and associated swivel must be dimensioned so as to withstand hawser forces approaching 600 metric tons. Furthermore, the hawser attachment point and swivel will be placed deep down into a shaft and therefore are not readily accessible for maintenance, replacement of the hawser, etc.

In another type of rotatable buoy top, which also is to be used in the North Sea, the hawser is run through a hawsehole and over a sheave in order to make the elastic hawser length substantially greater than the distance between the buoy top and the ship.

A major disadvantage in said buoy tops having hawseholes and sheaves for the hawser has been excessive wear of the hawser due to the contact with these elements. Furthermore, experience has shown that the elasticity of the hawser is substantially reduced after some use, and it is further redecued in the working condition due to wave frequencies giving relatively high velocities. These circumstances have resulted in several hawser failures.

It has also been suggested to utilize a hydraulic compensator for dampening the maximum load in the mooring hawser, but this concept has met with substantial scepticism due to the large amounts of energy pulsating in the hydraulic damping system. This energy may of course be dissipated by cooling, but it is not desirable to have a cooling water system on the buoy, which should be unmanned in the mooring condition.

The object of the invention is therefore to compensate the variation in the distance between the ship and buoy without providing additional elasticity in the hawser by making it longer than the distance between the buoy and the ship, and without utilizing a hydraulic compensating device.

SUMMARY OF THE INVENTION

The object is obtained by arranging the hawser attachment on a linkage where at least one of the links is connected to a spring in order for the buoy attachment to be resiliently supported. For the mooring forces and compensating lengths in question in single point mooring of ships, which may be 150 metric tons and 6 meters, it is difficult to obtain reasonable dimensions in a convensional spring arrangement. However, by using relatively long and slender torsion bars it is possible to obtain reasonable dimensions, particularly if the bars are made of Titanium, having high strength and great elasticity (low modulus of elasticity). In order to further increase the elasticity, a plurality of torsion bars may be used. A linkage system also makes it possible to obtain characteristics which utilize most of the resilience in the torsion bars at the normal maximum load, while further increase up to the ultimate strength of the hawser will give just a small additional stress in the torsion bars. The ultimate strength is normally about four times higher than the normal maximum load. The ship is usually disconnected following a stress peak equal to the maximum load.

The principle according to the invention using a plurality of torsion springs in parallel may be advantageously used in several structures other than mooring ships to rotatable loading towers. The characteristics of a long resilient movement in the normal working range and a small additional movement in the overload range may be used in all buffers and shock absorbers where there is room for the relatively slender torsion bars.

BRIEF DESCRIPTION OF THE DRAWINGS

The accompanying drawings illustrate the best mode presently contemplated by the inventor for carrying out the invention.

In the drawings:

FIG. 2 is a perspective view of the linkage mechanism;

FIG. 3 illustrates an alternate embodiment of torsion moment transmittal;

FIG. 4 is a graph illustrating the force-deflection curve; and

FIG. 5 illustrates an embodiment utilizing seven torsion bars.

DESCRIPTION OF THE PREFERRED EMBODIMENTS

Figure 1:
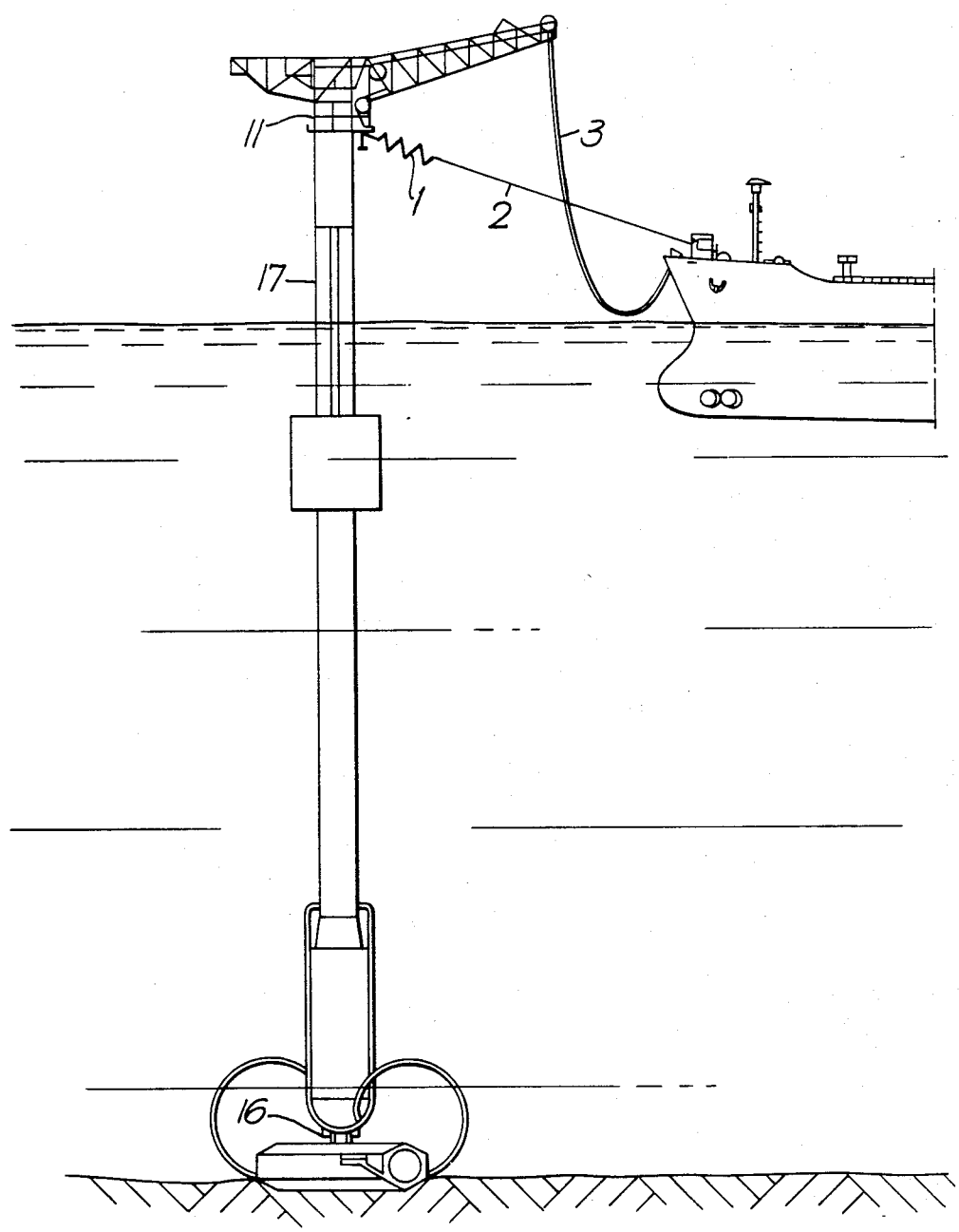
FIG. 1 is a schematic view of a loading tower attached to a ship and wherein the various aspects of the invention are incorporated.

Examplifying embodiments of the invention are shown in the figures. FIG. 1 shows a jointed 16 loading tower 17 having a rotatable top 11 and a tanker moored to the tower. The linkage is not shown due to the small scale, but the resilient element 1 is symbolically indicated. It is attached to the mooring hawser 2. The loading hose 3 for transporting oil to the ship is also shown.

FIG. 2 shows an example of the spring linkage. Links 4, 5, 6, 7 are jointed to each other and to the rotatable top 11 in the lugs 13 and 14. The eye 12 of the hawser 2 is attached to the joint 15 between the links 5, 6. The torsion bar 8 is rigidly connected to the link 5, while the torsion bar 9 is similarly rigidly connected to the link 6. Here the connection between the torsion bars 8, 9 and links 5, 6 is shown in the same axis as the joint connections with the links 4, 7, but the function will be the same if the connection lies outside the joint axes. In the upper end the torsion bars 8, 9 are rigidly connected to a common yoke 10. The torsion moments, which by symmetrical hawser pull will be equal and opposite, will in this manner be counterbalanced so that the torsion moments in their entirety will be absorbed in the yoke 10, thus not necessitating transmittal of forces to the buoy top 11. Due to the weight of the yoke 10 and the torsion bars 8, 9, the links 4, 5, 6, 7 and the vertical components of the hawser pull, which may give tensile or compressive stress in the torsion bars 8, 9, it is suitable to connect the yoke 10 to the top 11. The rigid connection of the torsion bars 8, 9 at both ends may advantageously be rigid as regards torsion, but permit some axial and angular motion. As is indicated with arrows at the lower ends of the torsion bars 8, 9, the lower ends will move in the horizontal plane alone circles having their center in the lugs 13, 14.

The hawser attachment 15 will move approximately linearly in the horizontal plane, as indicated by the arrows. The normal working range will be from the phantom position 15' to 15, and further movement will represent overloading.

FIG. 3 shows an alternative way of transmitting torsion moment from the torsion bar 8. The upper end of the bar is attached to a plate 19, which in turn is attached to a tube 18 which is concentric with the torsion bar 8. At the lower end the torsion bar 8 is attached to the link 5 concentric with the joint to the neighboring link 4, which in turn is attached to the tube 18.

A typical characteristic curve for the hawser force versus spring deflection is shown in FIG. 4. The normal working range is shown in solid line, while the overload range up to hawser failure is shown in broken line.

Force and spring deflection for positions 15' and 15 in FIG. 2 is shown in the graph.

FIG. 5 shows how a series of seven parallel torsion bars 22 may be arranged. The six outer bars will rotate about the same axis 21 as the middle bar, but concurrently rotate about their own axis with the same angle as the middle bar. Thereby the torsion moment will be approximately seven times as large as for one single bar. With the bars arranged as shown in the figure they may rotate about 120° before the outer bars come into contact with the middle bar. The bars are non-rotatably connected to the plate 20 at one end and to the plate 20' at the other end.

In order to obtain equal axial loading in the parallel torsion bars, it may be advantageous to avoid a central bar, so that all bars will lie at the same distance from the central axis of the spring.

I claim:

1. A device for reducing tensile forces in a mooring hawser (2) occurring when a ship such as a tanker is moored to a loading buoy or a fixed or jointed (16) tower (17) having a rotatable top (11), comprising, in combination:
   (a) a symmetrical linkage (4–7) comprising four links (4, 5, 6, 7) and to which the said hawser (2) is attached (15) on the axis of symmetry thereof,
   (b) means (13, 14) pivotally connecting said linkage (4–7) to the said rotatable top (11),
   (c) a pair of torsion bar means (8, 9) with one end of said pair being non-rotatably attached to one or more of the links (4, 5, 6, 7) in said linkage (4–7) and the other end of said pair being secured against rotation in a common yoke (10) so that torsion moments are entirely absorbed as internal forces in said yoke (10),
   (d) each of said pair of torsion bar means (8, 9) comprising several torsion bars (22) which are non-rotatably attached at each end to a plate (20, 20') having an axis (21), so that when one of said plates (20) is rotated about said axis (21), the rotation angle for each torsion bar (22) is the same as for said one of said plates (20).

2. A device for reducing tensile forces in a mooring hawser (2) occurring when a ship such as a tanker is moored to a loading buoy or a fixed or jointed (16) tower (17) having a rotatable top (11), comprising, in combination:
   (a) a linkage (4–7) to which the said hawser (2) is attached,
   (b) means (13, 14) pivotally connecting said linkage (4–7) to the said rotatable top (11),
   (c) one or more torsion bar means (8, 9) with one end thereof being non-rotatably attached to one or more of the links (4, 5, 6, 7) in said linkage (4–7) and the other end thereof also being secured against rotation,
   (d) the torsion moment for each torsion bar means (8, 9) having the same axis as the joint between two links (4, 5 and 6, 7),
   (e) each of said torsion bar means (8, 9) being connected at one end to one of said links (5, 6),
   (f) and a transition piece (19) and tube (18) serving to connect the other end of each of said torsion bar means (8, 9) to the other of said links (4, 7),
   (g) each of said torsion bar means (8, 9) comprising several torsion bars (22) which are non-rotatably attached at each end to a plate (20, 20') having an axis (21), so that when one of said plates (20) is rotated about said axis (21), the rotation angle for each torsion bar (22) is the same as for said one of said plates (20).

* * * * *